Feb. 10, 1931.

J. M. ALLEN

HOSIERY

Original Filed July 2, 1927

Re. 17,958

Inventor.
John M. Allen.
by H. S. Dennison
Atty.

Reissued Feb. 10, 1931

Re. 17,958

UNITED STATES PATENT OFFICE

JOHN M. ALLEN, OF TORONTO, ONTARIO, CANADA, ASSIGNOR TO SCOTT & WILLIAMS, INCORPORATED, OF NEW YORK, N. Y.

HOSIERY

Original application filed July 2, 1927, Serial No. 203,000. Renewed June 11, 1928. Original No. 1,754,185, dated April 8, 1930. Application for reissue filed December 27, 1930. Serial No. 505,155.

The principal object of the invention is to provide a knitted stocking with a foot shaped free from irregularities of contour so that it will fit the foot snugly without binding, will not have any loose portions to wrinkle or pucker, and still presenting a neat appearing and comfortable garment.

A further and important object is to knit the fabric with wales arranged to follow the curves of the foot so that the stocking will fit naturally and without strain, thereby requiring less tension on garters and consequently enhancing the life of the stocking.

The principal features of the invention consist in the novel formation of the toe of the stocking by having narrowed and widened segments, lengthening the gore and continuing the instep yarn past the commencement of the gore, introducing a plurality of knitted courses into the gore of a lesser length than said gore and finally looping the completed courses of the underside of the toe to the bottom half of the foot. In this way a plurality of courses of the inward end of the tapering top segment of the toe are knit in integral succession to the instep fabric and are formed of a yarn lighter in weight than the rest of the toe.

In the drawings, Figure 1 is an elevational view showing my improved hose as fitted on the foot.

In the knitting of the stocking, when made on a circular knitting machine, the heel A is formed in the usual manner using one-half of the needles, reciprocating the machine and on each course picking up out of action one needle on each side until approximately only one-fifth of the total number of needles knitting the heel segment are knitting, then taking down into operation one needle net on each side on each course until half the needles are again in action, thus completing the heel pouch.

When the heel is finished as described the foot B is knitted, as usual, with the full complement of needles, to the point C which is the point of commencement of the toe. The opposite half of the full complement of needles to those used in making the heel pouch are brought into operation to make the toe pouch. The knitting of the top half of the foot is continued from the point C with the instep yarn which is much finer than that used in the bottom half and is knitted tighter and the needles are raised out of action one at a time on each side until about twelve on each side have been raised then the cotton yarn, which is usually used in the construction of the toe as a reinforcement, is introduced commencing from the point D. The knitting is continued as before, raising the needles progressively out of action on each side until a total of about 48 needles have been raised out of action on each side leaving about 24 needles still knitting across the point of the toe which is thus formed much narrower than usual.

It will of course be understood that the number of needles mentioned may be varied as desired according to the number of needles in the cylinder, the stocking herein illustrated being formed on a 240 needle machine.

Immediately following the raising of the last of the above mentioned complement of about 48 needles a side, the needles that have been raised out of action in the knitting of the cotton yarn, numbering approximately 36, are dropped into action all at once, leaving the 12 needles extending from C to D out of action at each side. One course is then knitted around the end of the toe between the points marked D using all but the 12 needles left out of action on each side. Approximately seven more courses F are then knitted, one or more needles on each side being raised out of action on each course, which forms a gusset E with tapered ends G the points of which extend to the points D on each side.

When the gusset courses mentioned have been completed the remainder of the 36 active needles on each side, that is 29 needles, are raised out of action at once and the knitting is then continued from the toe point dropping one or more needles into action on each side of the gore until all of the 36 needles are again put back into action and also the twelve on each side that were raised out of action between the points C and D. This then brings back into action the full complement of needles of one-half of the machine.

Figure 1:
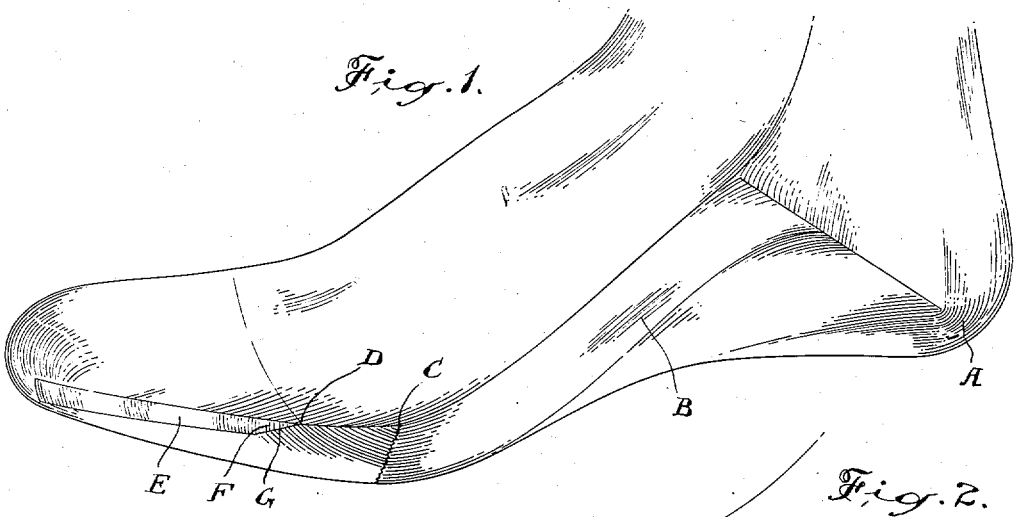
Figure 2:
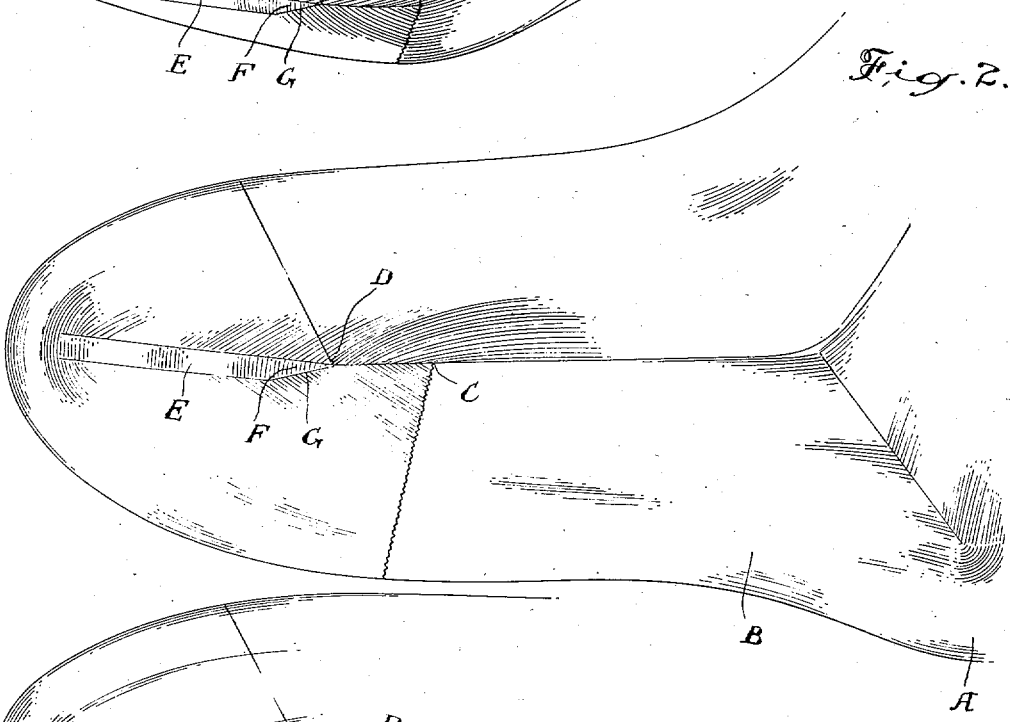
Figure 2 is a side view of the knitted foot shown flat.
Figure 3:
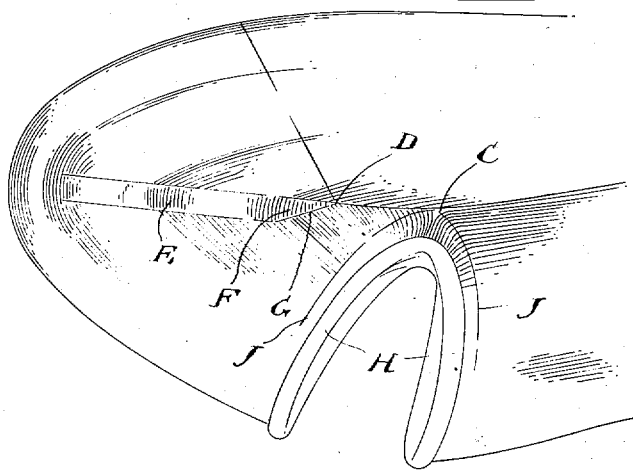
Figure 3 is a detail side view of the toe portion illustrating the manner in which the fabric is knitted for completing the foot by looping.

From this point circular knitting is resumed forming the band of fabric H shown in Fig. 3, a sufficient number of courses for looping the toe pocket to the bottom of the foot.

The two half circles of the band H are then cast on to a looping machine from the point C, the surplus courses either being cut away by the looping machine or ravelled back, and the foot is complete. The looping line J is thus located on the bottom of the foot and is well back to the ball of the foot. It is located at the widest part of the foot and is therefore at the most desirable point as the loop stitches are loose and equal to several ordinary courses. This arrangement of the loop stitching allows the greatest width of spread at the most desirable point and being beneath the foot it is invisible when worn.

The construction of the toe produced in the manner described is narrower than the ordinary construction by approximately 24 needles on each side and with the addition of the interposed courses on each side the toe is 32 courses smaller or about one inch smaller in circumference at D than the toe produced in the ordinary manner. The longer, narrower, toe structure with the yarn change at D on the top side forward of the widest part and the looping at C on the bottom side well back on the widest part, eliminates the bulging surplus or "dog ears" always found in the shorter broader structure of seamless toe which is a source of much discomfort to the wearer. The fabric of the stocking when completed lies perfectly flat along the sides.

The tapering of the ends of the insert courses F is very important in eliminating the bulging surplus fabric mentioned and it also shapes the wales so that they conform to the curvature of the foot.

It will be readily understood that the shape and dimensions of the toe structure may be varied by lengthening the gore and altering the number of courses in the insert E, F.

What I claim as my invention is:—

1. A seamless foot hose having a tapering top toe segment, a plurality of insert courses knitted to the tapering sides and around the end of the top toe segment, each course having a number of stitches appreciably less than the number of stitches on the edge of said toe top, the successive insert courses being of a progressively differing length, a diverging bottom toe segment knitted to the insert courses and to the courses of the tapering toe top beyond the ends of the insert courses to meet the lower half of the foot section at the points of commencement of the tapered top segment.

2. A seamless stocking having a light weight instep yarn and a reinforced toe, the toe portion comprising tapering segments joined in gore lines arranged lengthwise of the foot, the instep yarn being continued into the top segment of the toe to a point intermediate of the length thereof and the remaining part of said segments being reinforced, and a gusset arranged between said toe segments the courses of which extend around the toe end and the ends of which are spaced from the inner ends of said gores.

3. A seamless stocking having light weight yarn in the instep and a heavier yarn in the toe, said toe being formed of tapering segments, the light yarn being continued from the instep into the top segment of the toe, said top segment having a yarn change intermediate of its length and the remaining portion formed of a heavy yarn, a plurality of insert courses knitted to the tapering edges and the end of the top toe segment, said insert courses being of progessively differing lengths forming a gusset with tapered ends, and the bottom toe segment being knitted to the insert courses and having its end stitched to the foot of the stocking.

4. A seamless foot hose formed with a light yarn in the instep and a heavier yarn in the toe and having the top half of the foot continued in a tapering toe top, said toe top having the yarn changed intermediate of its length from light to a heavier yarn, a plurality of insert courses knitted to the edge of the tapering toe and having a number of stitches in each course less than the number of stitches along the edge of the toe top, the successive insert courses being of progressively differing lengths, a bottom toe section having each successive course increased in length and knitted to the insert courses and to the light yarn courses of the tapering toe top beyond the ends of the insert courses to meet the lower half of the foot section at the points of commencement of the tapered top.

5. A seamless stocking having a light weight yarn in the instep and a heavier yarn in the toe in which the toe is formed of tapering segments the gore lines of which extend back to substantially the widest part of the foot of the wearer, the inner end of the toe bottom being looped to the foot bottom at the inner ends of the gores and a plurality of courses of the inward end of the tapering top segment is formed of the instep yarn in tight stitches to effect the shortening of the top of the foot relative to the bottom.

6. A seamless stocking having a light weight yarn in the instep and a heavier yarn in the toe in which the toe is formed of tapering segments the gore lines of which extend back to substantially the widest part of the foot of the wearer, the inner end of the toe bottom being looped to the foot bottom at the inner ends of the gores and a plurality of courses of the inward end of the tapering top segment being knit in integral succession to the instep and formed of yarn lighter in weight than the rest of the toe.

7. A seamless stocking having a light weight yarn in the instep and a heavier yarn in the toe in which the toe is formed of tapering segments, the inner end of the toe also being looped to the foot bottom at the inner ends of the gores and a plurality of courses of the inward end of the tapering top segment being knit in integral succession to the instep and formed of a yarn lighter in weight than the rest of the toe.

8. A method of knitting hoisery, comprising knitting to a foot section a tapering toe top by progressively decreasing the number of needles in action until the top is reduced to a narrow end, then immediately returning a plurality of needles into action knitting a course in continuation of the toe and along the tapering sides, then knitting a plurality of courses around the toe end, then removing from action the needles returned to action, then knitting a diverging toe section to the courses knitted to the tapering edges of the toe top progressively increasing the number of needles in action, and finally joining the completed bottom section to the bottom of the foot.

9. A method of knitting seamless hosiery, comprising knitting a seamless foot section, then removing a plurality of needles from action and continuing the knitting of the upper half of the fabric, progressively decreasing the number of needles in action to form a toe top tapered to a narrow end, then returning immediately into action a plurality of needles of a lesser number than those removed from action for forming the tapered top and knitting a course of stitches along the tapered edges and around the end of the toe for the major portion of the length of said tapered edges, then knitting to the aforesaid course a plurality of courses removing needles from action progressively to knit a gusset with tapered ends, then withdrawing from action the remainder of the returned needles, then progressively returning needles into action progressively knitting a diverging toe bottom to the inserted toe gusset and to the edges of the tapered toe top extending beyond the ends of the gusset, and finally looping the end of the toe bottom to the foot bottom.

10. A method of knitting seamless hosiery, comprising knitting a foot section with a full complement of needles to a point corresponding with the widest part of the foot of the wearer, then removing needles out of action and continuing with the instep yarn to knit a tapering toe top for about sixteen or more courses, then making a yarn change using a reinforcing yarn and continuing the tapered toe to a narrow end of about twenty-four stitches or less, then returning a sufficient number of needles into action to knit a row of stitches around the toe end and to the points of the yarn change, then knitting a plurality of courses around the toe end forming a tapered gusset extending back to the instep yarn, then knitting a toe bottom joining the courses thereof to the gusset and to the ends of the courses of the instep yarn extending from the commencement of the tapered toe top, the whole of the toe bottom being of reinforcing yarn.

11. A knitted stocking having a toe comprising narrowed and widened segments and a gusset located between the segments on both sides of the toe and extending around the end, said gusset having substantially parallel sides throughout the major portion of its length, said narrowed and widened segments extending rearwardly of the gusset.

12. A knitted stocking having a toe comprising narrowed and widened segments and a tapered gusset located between the segments on both sides of the toe and extending around the end, said gusset presenting substantially parallel sides to the narrowed and widened segments throughout the major portion of its length, said narrowed and widened segments extending rearwardly of the points of the gusset an appreciable extent.

13. A knitted stocking having a toe comprising narrowed and widened segments and a gusset located between the segments on both sides of the toe and extending around the end, every course of said gusset having an appreciably lesser number of stitches than the number of stitches around the edge of each segment, the bottom toe segment being looped to the bottom of the foot of the stocking.

JOHN M. ALLEN.